Figure 1:
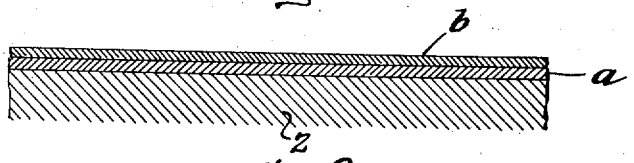

Dec. 15, 1931. A. R. TRIST Re. 18,290

MERCURIAL PRINTING SURFACE

Original Filed Oct. 5, 1926

Inventor

Arthur Ronald Trist

By his Attorneys

Duell, Dunn & Anderson

Reissued Dec. 15, 1931 Re. 18,290

UNITED STATES PATENT OFFICE

ARTHUR RONALD TRIST, OF LONDON, ENGLAND, ASSIGNOR, BY MESNE ASSIGNMENTS, TO PANTONE CORPORATION, OF NEW YORK, N. Y., A CORPORATION OF DELAWARE

MERCURIAL PRINTING SURFACE

Original No. 1,665,000, dated April 3, 1928, Serial No. 139,651, filed October 5, 1926, and in Great Britain November 5, 1925. Application for reissue filed November 4, 1930. Serial No. 493,445.

This invention relates to improvements in mercurial printing surfaces and has for its object the production of a truly planographic surface of this type with greater ease and reliability by comparatively unskilled operators than has been possible heretofore.

In my British specification No. 225,928 a process by which a truly planographic printing surface can be produced has been fully described, said planographic printing surface comprising printing areas and recesses filled with a composition of copper, silver or gold and mercury prepared by electrodepositing a very thin layer of copper into the recesses in the plate, then a very thin layer of silver or gold on to the copper and so on until the recesses are filled up. The reason for adopting this method of producing the mercurial composition was to enable said composition to have some of the characteristics of both copper and silver or gold amalgams and to be of a firmly adherent nature. The metal of which this printing plate was made was defined as being unaffected by mercury and nickel was referred to by way of example. In the industrial manufacture of such a plate difficulties have been encountered inasmuch as it has been found that the presence of the smallest quantity of foreign matter or oxide remaining on the nickel prevents that intimate adhesion of the initial layer of copper to the nickel which is necessary to maintain the layers in place after they have been treated with mercury.

Experiments have shown that the alternate layers of copper and silver or gold prevent diffusion of the mercury from the amalgam to such a degree as to render unnecessary the use of a metal unaffected by mercury for supporting the amalgum in place; further it has been found that small traces of etching fluid on a copper surface do not have such a deleterious effect on the final result as when nickel is employed and although cleanliness is of importance, that cleanliness which is readily obtainable in an ordinary workshop by an average artisan is sufficient to obtain reliable and satisfactory printing plates to be obtained.

This invention consists in the formation of a planographic printing plate having ink retaining areas and mercurial ink refusing areas, comprising an electrodeposited layer of metal with which mercury can amalgamate, an electrodeposited layer of a metal unaffected by mercury to which printing ink will adhere, recesses in such last named layer locally exposing the first named layer, said recesses being filled with a plurality of alternately electrodeposited films of two metals one of which forms a hard amalgam with mercury, whilst the other takes a high polish when treated with mercury, a film of the last named metal being outermost, and the surface of the printing plate being treated with mercury so as to produce areas to which printing ink will not adhere.

In the drawings:—

Fig. 1 diagrammatically illustrates in section an improved plate according to this invention before etching.

Figure 2:
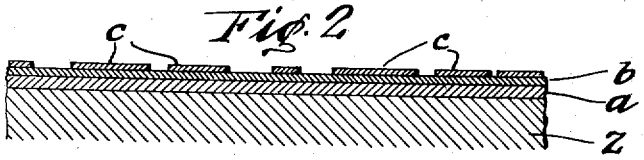

Fig. 2 diagrammatically illustrates in section an improved plate according to this invention after the resist has been locally applied.

Figure 3:
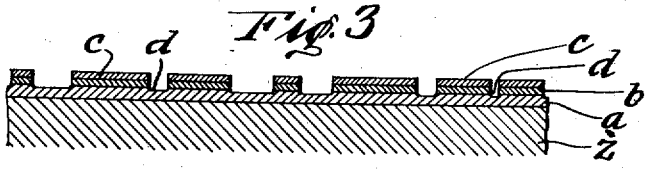

Fig. 3 diagrammatically illustrates in section an improved plate according to this invention after etching.

Figure 4:
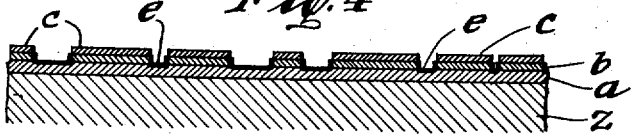

Fig. 4 diagrammatically illustrates in section an improved plate according to this invention after the initial electrodeposit has been effected in the etched areas.

Figure 5:
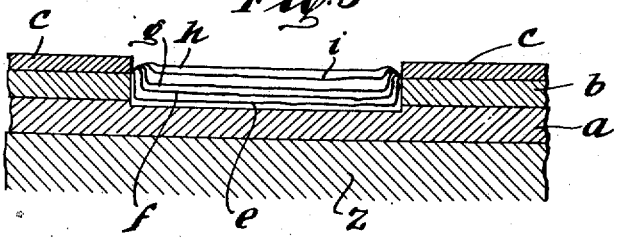
Figure 6:
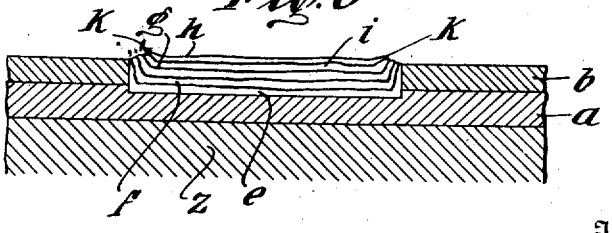

Fig. 5 diagrammatically illustrates in section an improved plate according to this invention after the alternate electrodeposits of copper and silver or silver and copper have been applied to the initial deposit, and Fig. 6 diagrammatically illustrates in section the finished plate ready for mercurializing.

The above figures are not strictly to scale and only serve the purpose of showing steps by which it is possible to produce the improved plate on an iron base.

Referring to the drawings *z* is the iron base on which a layer *a* of copper and a layer *b* of nickel have been electrodeposited, the thickness of the layer of nickel being about one or one and one half one thousandths part of one inch whilst the layer of copper may be of equal thickness or more or less than this amount as may be found convenient.

Local resists *c* are applied to said nickel layer *b* in any suitable way and may be composed of what is known as "burnt in enamel". The local resists *c* may be light sensitive bichromated fish glue enamel, and after the nickel surface is coated with this enamel, a photo-print is taken from an irregular grain or screened negative, preferably by means of a point source of light. After exposure, the printing surface is wash developed and baked in the well known manner. Portions of the nickel layer *b* are exposed in the non-printing areas of the plate, the resist *c* remaining on the plate in the printing areas.

The exposed surface of the nickel layer *b* is then etched, by means of any suitable corrosive fluid such as an iron chloride bath, until the copper layer *a* is exposed and etching may be continued until about one ten thousandths part of an inch of the copper is removed; the total depth of each of the etched recesses *d* being about eleven or sixteen ten thousandths part of an inch.

A layer *e* of copper, silver or gold is then electrodeposited into each of the recesses *d* so as to form a lining for such recesses and a protective covering for the copper *a* inasmuch as it has been found that if a thin layer of copper or a metal having a greater affinity for mercury than copper is electrodeposited on to an electrodeposited copper surface, the last electrodeposited metal layer or the interface between the layers to some extent prevents mercury diffusing into the copper previously electrodeposited.

This prevention of diffusion is probably due to the fact that as copper is electropositive to silver or gold the intimate molecular interchange at the interface during the plating process produces actually or in effect an alloy of metals having this peculiar characteristic.

It has been found that satisfactory results are obtained if the thickness of the layer *e* of copper, silver or gold is about one fifth of the total depth of a recess *d* or about twenty five one hundred thousandths part of an inch.

Each lever *e* if of silver or gold has a layer *f* of copper electrodeposited thereon, said layer *f* being approximately equal in thickness to that of the layer *e*; but if the layer *e* is of copper then the layer *f* is of silver or gold.

As illustrated there are five layers in all of which *g* and *h* are of silver or gold and *i* of copper the silver or gold and copper layers being alternately applied so as to reduce the diffusion to a minimum.

Obviously the invention is not limited to five layers and any number of layers greater than two may be used provided that the last layer is of silver or gold so as to provide a polished nongranular face on mercurization.

By the use of the alternate layers of silver or gold and copper or copper and silver or gold not only is it possible to obtain a large number of interfaces but it is also possible to arrange that each of the recesses *d* are exactly filled up so as to produce a planographic printing surface.

Those skilled in electrodeposition of metal into recesses will recognize that it is impossible to prevent a ridge *k* building up around each recess and this is removed by rubbing with polishing charcoal or very fine emery paper so that the printing surface is and remains perfectly planographic.

The non-printing parts of the printing surface are mercurialized by the application of mercury in a metallic state for example, and finally the resists *c* can be removed if so desired although this step is by no means absolutely necessary.

I claim:—

1. A planographic printing plate having ink retaining areas and mercurial ink refusing areas, comprising a base plate, an electrodeposited layer of metal with which mercury can amalgamate, an electrodeposited layer of a metal unaffected by mercury to which printing ink will adhere, a recess or recesses passing through said last named layer so as locally to expose the first named layer, and a highly polished mercurial amalgam in each recess.

2. A planographic printing plate having ink retaining areas and mercurial ink refusing areas, comprising a base plate, an electrodeposited layer of metal with which mercury can amalgamate, an electrodeposited layer of a metal unaffected by mercury to which printing ink will adhere, a recess or recesses passing through said last named layer so as locally to expose the first named layer, and a plurality of alternately electrodeposited films of two metals in each recess one of said films forming a hard amalgam with mercury whilst the other film takes a high polish when treated with mercury, a film of the last named metal being outermost; the surface of the printing plate being treated with mercury so as to produce mercurial areas to which printing ink will not adhere.

3. A process for producing a planographic printing plate having ink retaining areas and mercurial ink refusing areas comprising the electrolytic deposition of a layer of copper on to an iron base, the electrolytic deposition of a layer of nickel on to said layer of copper, the application of a local resist to the nickel layer to protect the printing areas, the etching away of the unprotected parts of the nickel layer to expose the copper layer and form a recess or recesses, the electrolytic deposition on the exposed parts of the nickel and the copper of a thin layer of a noble metal, the electrolytic deposition of alternate thin layers of copper and a noble metal on to said thin layer so as to fill up said recess or recesses and externaly present a surface of a noble metal, and the external application of mercury to such thin layers.

4. A process for producing a planographic printing plate having ink retaining areas and mercurial ink refusing areas comprising the electrolytic deposition of a layer of copper on to an iron base, the electrolytic deposition of a layer of nickel on to said copper layer, the application of a local resist to such nickel layer to protect the printing areas, the etching away of the unprotected parts of the nickel layer to expose the copper layer and form a recess or recesses, the electrolytic deposition on the exposed parts of the nickel and the copper of a thin layer of copper, the electrolytic deposition of alternate thin layers of a noble metal and copper on to said thin layer so as to fill up said recess or recesses and externally present a surface of a noble metal, and the external application of mercury to such thin layers.

5. A process for producing a planographic printing plate having ink retaining areas and mercurial ink refusing areas comprising the electrolytic deposition of a layer of copper one or one and one half one thousandths part of an inch in thickness on to an iron base, the electrolytic deposition of a layer of nickel one or one and one half one thousandths part of an inch in thickness on to said copper layer, the application of a local resist to said nickel layer to protect the printing areas, the etching away of the unprotected parts of the nickel layer to expose the copper layer and form a recess or recesses, the electrolytic deposition on the exposed parts of the nickel and the copper of a thin layer of a noble metal, the electrolytic deposition of alternate thin layers of copper and a noble metal on to said thin layer so as to fill up said recess or recesses and externally present a surface of a noble metal, and the external application of mercury to such thin layers.

6. A process for producing a planographic printing plate having ink retaining areas and mercurial ink refusing areas comprising the electrolytic deposition of a layer of copper one or one and one half one thousandths part of an inch in thickness on to an iron base, the electrolytic deposition of a layer of nickel one or one and one half one thousandths part of an inch in thickness on to said copper layer, the application of a local resist to said nickel layer to protect the printing areas, the etching away of the unprotected parts of the nickel layer to expose the copper layer and penetrating the copper layer for one ten thousandth part of an inch to form a recess or recesses, the electrolytic deposition on the exposed parts of the nickel and the copper of a thin layer of a noble metal, the electrolytic deposition of alternate thin layers of copper and a noble metal on to said thin layer so as to fill up said recess or recesses and externally present a surface of a noble metal and the external application of mercury to such thin layers.

7. A process for producing a planographic printing plate having ink retaining areas and mercurial ink refusing areas comprising the electrolytic deposition of a layer of copper one or one and one half one thousandths part of an inch in thickness on to an iron base, the electrolytic deposition of a layer of nickel one or one and one half one thousandths part of an inch in thickness on to said copper layer, the application of a local resist to said nickel layer to protect the printing areas, the etching away of the unprotected parts of the nickel layer to expose the copper layer and penetrating the copper layer for one ten thousandth part of an inch to form a recess or recesses, the electrolytic deposition on the exposed parts of the nickel and the copper of a thin layer of copper, the electrolytic deposition of alternate thin layers of a noble metal and copper on to said thin layer so as to fill up said recess or recesses and externally present a surface of a noble metal, and the external application of mercury to such thin layers.

8. A process for producing a planographic printing plate having ink retaining areas and mercurial ink refusing areas comprising the electrolytic deposition of a layer of copper on to an iron base, the electrolytic deposition of a layer of nickel on to said layer of copper, the application of a local resist to the nickel layer to protect the printing areas, the etching away of the unprotected parts of the nickel layer to expose the copper layer and form a recess or recesses, the electrolytic deposition on the exposed parts of the nickel and the copper of a thin layer of silver, the electrolytic deposition of alternate thin layers of copper and silver on to said thin layer so as to fill up said recess or recesses and externally present a surface of silver, and the external application of mercury to such thin layers.

9. A process for producing a planographic printing plate having ink retaining areas and mercurial ink refusing areas comprising the electrolytic deposition of a layer of copper on to an iron base, the electrolytic deposition of a layer of nickel on to said copper layer, the application of a local resist to such nickel layer to protect the printing areas, the etching away of the unprotected parts of the nickel layer to expose the copper layer and form a recess or recesses, the electrolytic deposition on the exposed parts of the nickel and the copper of a thin layer of copper, the electrolytic deposition of alternate thin layers of silver and copper on to said thin layer so as to fill up said recess or recesses and externally present a surface of silver, and the external application of mercury to such thin layers.

10. A process for producing a planographic printing plate having ink retaining areas and mercurial ink refusing areas comprising the electrolytic deposition of a layer of copper one or one and one half one thousandths part of an inch in thickness on to an iron base, the electrolytic deposition of a layer of nickel one or one and one half one thousandths part of an inch in thickness on to said copper layer, the application of a local resist to said nickel layer to protect the printing areas, the etching away of the unprotected parts of the nickel layer to expose the copper layer and form a recess or recesses, the electrolytic deposition on the exposed parts of the nickel and the copper of a thin layer of silver, the electrolytic deposition of alternate thin layers of copper and silver on to said thin layer so as to fill up said recess or recesses and externally present a surface of silver, and the external application of mercury to such thin layers.

11. A process for producing a planographic printing plate having ink retaining areas and mercurial ink refusing areas comprising the electrolytic deposition of a layer of copper one or one and one half one thousandths part of an inch in thickness on to an iron base, the electrolytic deposition of a layer of nickel one or one and one half one thousandths part of an inch in thickness on to said copper layer, the application of a local resist to said nickel layer to protect the printing areas, the etching away of the unprotected parts of the nickel layer to expose the copper layer and to penetrate the copper layer for one ten thousandth part of an inch to form a recess or recesses, the electrolytic deposition on the exposed parts of the nickel and the copper of a thin layer of silver, the electrolytic deposition of alternate thin layers of copper and silver on to said thin layer so as to fill up said recess or recesses and externally present a surface of silver, and the external application of mercury to such thin layers.

12. A process for producing a planographic printing plate having ink retaining areas and mercurial ink refusing areas comprising the electrolytic deposition of a layer of copper one or one and one half one thousandths part of an inch in thickness on to an iron base, the electrolytic deposition of a layer of nickel one or one and one half one thousandths part of an inch in thickness on to said copper layer, the application of a local resist to said nickel layer to protect the printing areas, the etching away of the unprotected parts of the nickel layer to expose the copper layer and to penetrate the copper layer for one ten thousandth part of an inch to form a recess or recesses, the electrolytic deposition on the exposed parts of the nickel and the copper of a thin layer of copper, the electrolytic deposition of alternate thin layers of silver and copper on to said thin layer so as to fill up said recess or recesses and externally present a surface of silver, and the external application of mercury to such thin layers.

13. A planographic printing plate having ink-retaining and mercurial ink-refusing areas, comprising a base plate, and an electrodeposited layer of metal with which mercury can amalgamate and an electrodeposited layer of a metal unaffected by mercury to which printing ink will adhere, a recess or recesses passing through said last named layer so as locally to expose the first named layer and a firmly adherent electrodeposited and amalgamated layer of precious metal in each recess.

14. A planographic printing plate having ink-retaining and mercurial ink-refusing areas, comprising a base plate, and an electrodeposited layer of metal with which mercury can amalgamate and an electrodeposited layer of a metal unaffected by mercury to which printing ink will adhere, a recess or recesses passing through said last named layer so as locally to expose the first named layer and a firmly adherent electrodeposited and amalgamated layer of silver in each recess.

In witness whereof I have hereunto set my hand this 24th day of October, 1930.

A. RONALD TRIST.